No. 3,411,967
PROCESS OF SIMULTANEOUSLY FOAMING AND LAMINATING POLYOLEFIN FILM TO A SOLID BACKING
Stanley P. Rowland, New Orleans, La., and Dorothee M. McClain and Melvin F. Maringer, Cincinnati, Ohio, assignors to National Distillers and Chemical Corporation, New York, N.Y., a corporation of Virginia
No Drawing. Filed July 14, 1964, Ser. No. 382,649
9 Claims. (Cl. 156—79)

This invention relates to foamed plastics and particularly to improved foamed plastic films.

The value of foamed or cellular plastic materials has long been known. Such materials have found application in many fields, for example as insulating coverings for electrical conductors, dielectric filler material; insulation for low temperature storage, industrial piping and equipment, refrigerators, home and industrial buildings and for wearing apparel; sound absorbers, life belts, life jackets, and other floatable devices; packaging materials; cushioning for furniture, bedding, carpets, autos, and trucks; decorative applications in advertising and in home uses; and the like. For many of these purposes it is desired that the foamed products be fine-celled and that the cells be discrete and uniformly distributed throughout the film in order to insure uniformity of the required insulating or mechanical properties, including uniform strength and smooth surface. In addition, for many specific applications of each of the above general type applications, it is particularly desired that the foamed film, which may be unsupported or supported on one substrate or between two substrates, be of uniform thickness, be easy to handle and fabricate to the desired form, exhibit adhesion to various substrates without an additional adhesive, and be capable of rapid, uniform production. Examples of such applications are packaging applications employing a foam film for cushioning and insulating properties, textile applications employing a foam film for insulating properties, decorative applications employing a foam film for appearance and softness of hand, and like applications.

It is known that foamed products can be prepared by introducing a blowing agent into a plastic and shaping the resulting mixture into a cellular state by extruding, calendering, molding, or casting. Principal success in past art has been with polyvinyl chloride polymers with which use of a plastisol technique produced uniform cellular products with a smooth surface; however, control of uniformity has presented problems with the plastisol technique.

For polyolefin polymers and other type polymers, such as acrylics, cellulose types, polystyrenes, nylon types, etc., which are not adaptable to the plastisol technique, fabrication methods for converting the polymers to a uniform cellular product are more extensive in equipment requirement and considerably more difficult to control. The methods and apparatus heretofore known for producing such cellular structures have not been satisfactory in producing foamed film or sheet of uniform thickness comprising a multitude of small discrete cells distributed uniformly throughout the foamed film as well as having a smooth surface.

It is known that by the use of special fabrication techniques, such as ionizing radiation for cross-linking of the polymer, chemical cross-linking agents for cross-linking the polymer, specially-designed extruder screws and extruder barrels for homogeneous dispersion of expanding gas, specially-designed dies and take-up devices for control of the hot expanded polymer product, and the like, foamed films or sheets can be obtained of uniform thickness and uniform distribution of the cells. These methods, however, have exhibited difficult control for reproducibility of cell size and cell distribution and, in addition, do not yield films with smooth surfaces. In addition, these apparatus and methods lack versatility since they are limited to the production of a foamed film which then must be applied to other substrates for many applications and often requires an additional adhesive to laminate the cellular film to the other substrate.

It is an object of this invention to provide attractive foamed film having uniform thickness.

Another object is to provide foams that have fine uniform cell structure and that are bonded to one substrate or between two substrates.

Another object is to provide an easily handled, expandable film which may be employed in present day processes to obtain a homogeneous fine-celled foam between two substrates or attached to one substrate without the use of additional adhesives or laminating processes.

A still further object of this invention is to provide attractive, uniformly thick, fine-celled foams having at least one smooth, non-porous surface.

Additional objects will be apparent from the following detailed description.

By the process of this invention expanded or foamed plastic films and sheets can be formed by compounding a solid, synthetic plastic material with a blowing agent; forming the compounded plastic material into a film or sheet by any convenient means, e.g., by extruding, calendering, or casting at a temperature lower than the decomposition temperature of the blowing agent in combination with the compounded plastic; and subsequently subjecting the film or sheet to appropriate heating cycles. The expansion can take place either on one or between two substrates, for example, the film can be expanded on or between layers of metal foil, paper, cardboard, cloth, plastic film, plastic sheet, or the like, or combinations thereof.

The process is particularly applicable to polyolefins, such as low and high density polyethylene, polypropylene, polybutene-1, and copolymers or blends thereof. It is also applicable to acrylics, e.g., polymethyl methacrylate; high impact acrylics; cellulosics, e.g., cellulose butyrate, cellulose acetate, methyl cellulose, and ethyl cellulose; polystyrene and high impact polystyrene; vinyls, e.g., polyvinyl chloride, polyvinyl acetate, and polyvinyl alcohol; polyethers, e.g., polyethylene oxide; chlorinated polyethers; polyesters, e.g., poly(ethylene adipateterephthalate); polyamides, e.g., nylon 6/6 [poly(hexamethylene adipamide)] and nylon 6/10 [poly(hexamethylene sebacamide)]; fluorocarbons; and various copolymers of mixtures of the above. Also suitable are thermosetting resins, such as the phenolics, epoxy resins, melamines, polyurethanes, urea resins, and the like.

Although it is not necessary, the film to be expanded is preferably prepared from finely-divided polymer. By this is meant that all or substantially all of the particles of the polymer do not exceed a size of about 2000 microns, and the average particle size is less than about 1000 microns in diameter. Larger particle sizes tend to produce foams that are undesirably coarse and non-uniform in structure. They also require prolonged melt blending times to achieve uniform dispersion of the blowing agent, thereby enabling premature decomposition of the blowing agent. Within the above mentioned desired range, satisfactory foams can be produced, independent of particle size, particle shape, and particle size distribution. Where foams with especially fine cell size are desired, however, it is preferred to employ a plastic material wherein the average particle size is below 500 microns and most preferably below 50 microns. Subdivision of the polymeric material to the abovementioned pulverulent state may be accomplished in a number of ways commonly known to the art.

The blowing agent can be any heat-activated or chemically-activated substance that is capable of being dispersed uniformly throughout the polymer composition without decomposing appreciably and that is capable of liberating a gas upon being heated to an elevated temperature, preferably at a temperature near that at which the polymer or resin reaches the plastic state. Suitable agents include solid organic compounds such as benzene sulfonyl hydrazide, p,p'-oxybis(benzene sulfonyl hydrazide), azodicarbonamide, 4,4'-oxybis(benzene sulfonyl semicarbozide), N,N' - dimethyl - N,N' - dinitrosoterephthalamide, N,N'-dinitrosopentamethylene tetramine, p,p'-diphenyldisulfonyl azide, 4-tertiarybutylbenzol azide, diazoaminobenzene, azohexahydrobenzonitrile, 2,2' - azoisobutyronitrile, barium azodicarboxylate, and mixtures thereof, and solid inorganic compounds such as ammonium oxalate, ammonium sulfamate, ammonium thiosulfate, ammonium bicarbonate, sodium bicarbonate, sodium nitrate, and combinations of inorganic compounds that react upon heating to evolve volatiles, e.g., sodium nitride plus hydrated sodium acetate, sodium bicarbonate plus sodium hydrogen tartrate, and the like. The blowing agent is preferably, but not necessarily, a finely-divided chemically-decomposing solid.

For a given polymer the choice of the blowing agent depends upon the fusion temperature of the polymer, the decomposition range of the blowing agent, the rate of heating to be used in foaming, the properties desired of the foam, and so forth. Generally a blowing agent with a decomposition temperature above the fusion or melting temperature of the polymer should be chosen, although with rapid rates of heating blowing agents having lower decomposition temperatures can be utilized. The choice of the preferred blowing agent to use with a particular polymer can be arrived at by one skilled in the art through simple routine tests.

The amount of blowing agent used is the amount that effects the desired degree of foaming. Generally the amount required ranges from about 0.1 to about 10 percent by weight based on the total weight of the polymer. Above about 10 percent the foams tend to show large and uneven pore structure and to be unnecessarily contaminated with blowing agent residues. Less than 0.1 percent is generally ineffective for forming foams. Between 0.1 and 10 weight percent, the amount of blowing agent used will depend upon the required properties of the finished foams. Quantities near the lower end of the critical range produce foams of higher specific gravity. A preferred range of blowing agent for low density foams is between about 7 and 10 percent.

Since the proportion of blowing agent to polymer is relatively small, the homogeneity of distribution of the blowing agent throughout the polymer is critical to the quality of the resultant foam, particularly with respect to pore size and uniformity of pore distribution. Any convenient technique can be employed to mix the polymer and the blowing agent.

To produce the foamed films of this invention, the polymer film contianing the blowing agent is first heated to a temperature at which the combination of the fusion of the polymer and the decomposition of the blowing agent yields an expanded cellular structure. Completion of foam development or "curing" is achieved by maintaining the initially developed foam at a temperature above the decomposition temperature of the blowing agent for a time sufficient to substantially completely decompose the blowing agent. The temperature must not, however, exceed either the decomposition temperature of the polymer or of the substrate(s). In general a foaming and curing temperature only moderately above the melting temperature of the foamable polymer is satisfactory. More specifically, a foaming and curing temperature ranging from about 35° to 150° C. above the melting temperature of the foamable polymer is preferred. The total heating time required to produce a completely developed foamed sheet is short, being on the order of about twenty minutes or less and often as short as about six minutes or less. The heat may be supplied by any of a variety of means, e.g., dielectric heaters, hot gas, radiant heat, and the like.

To stabilize the foam after it has developed to the desired degree, it is cooled to a temperature below which there is no tendency for the cell walls of the foam to collapse. In general, the foam is stabilized by cooling it to a temperature reasonably below the fusion temperature of the plastic. Either shock cooling or gradual cooling may be employed.

Prior to the formation of the film or sheet to be expanded, the polymer-blowing agent mixture may be modified by the addition of catalyst activators, pigments, dyes, fillers, stabilizers, plasticizers, and the like.

By the process of this invention attractive foamed films having smooth surfaces; uniform thickness; and predominantly unicellular, fine, uniform cell structure can be produced from plastic film. For example, polyethylene film containing blowing agents such as p,p'-oxybis(benzene sulfonyl hydrazide), azadicarbonamide, or p,p'-oxybis-(benzene sulfonyl semicarbazide) can be expanded to foamed film from two to thirty times the thickness of the unexpanded film by subjecting the compounded film to heat. The film is expanded either on a substrate or between layers of substrate (which may be the same or different). The bond formed between the film and the substrate is excellent. If, however, an unsupported film is desired, the foamed layer can be separated from the substrate by applying an appropriate mold release agent between the film and the substrate prior to heating.

The density of the final product depends upon the amount of blowing agent, the heating cycle, the thickness of the unexpanded film, and whether the film is expanded with an open surface or between two substrates. If the unexpanded film is too thin, generally less than about 3 mils, there is a tendency for premature melting of the plastic and decomposition of the blowing agent, resulting in ruptures of the foam. If the unexpanded film is too thick, heat transfer to the interior of the film is insufficient to enable uniform foam development without surface degradation. Permissible thicknesses will vary with the type, stability, and heat transfer characteristics of the plastic as well as the rate of heating. Generally, unexpanded film thicknesses up to about 50 mils produce desirable foams having uniform and discrete pores, although greater thicknesses, for example up to 500 mils, are possible. A film expanded between substrates will tend to yield a foam of lower density than a foam produced from the same film expanded with an open surface because of the loss of gas from the open surface. It is preferred to expand the film between substrates even if the presence of one or both substrates is undesirable for subsequent use of the foam. Preferred removable substrates are thin, non-porous layers such as a foil. These can easily be removed from the foam after it has cooled if a mold release agent has been employed.

This invention is illustrated but in no way limited by the following examples in which all parts are given by weight unless otherwise specified.

EXAMPLE I

A polyethylene resin, 0.916 density, 22 g./10 min. melt index) of average particle size less than 300 microns was dry-blended in a twin cone blender with 8 percent by weight of p,p'-oxybis(benzene sulfonyl hydrazide). This mixture was then mixed on a two-roll mill for 15 minutes at 110° C. The blend was sheeted from the mill, cooled, and granulated. The granulated blend was fed to a standard flat-film extruder, equipped with a single conventional extruder screw operating at 3.8 to 1 compression ratio, and extruded at a tempearture ranging from 93° to 110° C. to a flat, unexpanded film 9.5 mils thick. This film was placed on 3-mil thick paper which in turn was placed for 7 minutes on a surface heated to 170° C. A tightly-bonded foamed film was produced on the paper. The foam, after cooling, was found to average 70.3 mils in thickness and to have an average density of 7.71 lbs. per cu. ft.

EXAMPLE II

A 10.5-mil thick film of low density polyethylene containing 8 percent by weight of p,p'-oxybis(benzene sulfonyl hydrazide) was prepared in accordance with the procedure of Example I. The film was placed between two 3-mil thick layers of paper and heated in an oven for 8 minutes at 170° C. The average thickness of the resulting expanded product after cooling to below 30° C. was 107.1 mils and the density was 5.59 lbs./cu. ft.

EXAMPLE III

A 12.2-mil thick film of low density polyethylene containing 8 percent by weight of p,p'-oxybis(benzene sulfonyl hydrazide), prepared in accordance with the procedure of Example I, was placed between two 1.5-mil thick layers of aluminum foil which had been coated with Fuoro Glide (Chemplast, Inc.) as a mold release agent. The combination was heated for 6 minutes on a 170° C. surface and subsequently cooled to room temperature. The foil was removed, and the product obtained was a foamed film of 122.6-mil average thickness with smooth shiny surfaces. Its density was 5.6 lbs./cu. ft.

EXAMPLE IV

A polyethylene resin, 0.916 density, 22 g./10 min. melt index) of average particle size less than 300 microns was dry-blended in a twin cone blender with 7.5 percent by weight of azodicarbonamide. This mixture was then mixed on a two-roll mill for 15 minutes at 120° C. The blended compound was sheeted from the mill, cooled, and granulated. The granulated compound was fed to the extruder as described in Example I. The temperature of the extrusion was controlled within the range of 93° to 120° C. An unexpanded cast film of 12.75 mils containing 7.5% blowing agent was obtained. This film was placed on a 1.5-mil thick aluminum foil and heated for 8 minutes on a 200° C. surface. Upon cooling to below 30° C., the average thickness of the resulting expanded product was 111.6 mils and its density was 6.52 lbs./cu. ft.

EXAMPLE V

A film of low density polyethylene having an average thickness of 11.09 mils and containing 8.5 percent by weight of p,p'-oxybis(benzene sulfonyl semicarbazide) was placed between two sheets of 1.5-mil thick aluminum foil and heated in an oven for 4 minutes at 215° C. After cooling to below 30° C., the average thickness of the resulting expanded film was 108 mils and its density was 5.86 lbs./cu. ft.

EXAMPLE VI

A sample of polyethylene (0.916 density, 22 g./10 min. melt index) was subdivided to particles below 50 microns. This powder was dry-blended with 8.5 weight percent of p,p'-oxybis-(benzene sulfonyl semicarbazide). The resultant blend was spread over a 1.5-mil thick sheet of aluminum foil and heated in a Carver press for 10 minutes at 165° C. A uniform unexpanded film, 12.08 mils thick and tightly adhering to the foil, was produced. Upon reheating the coated foil for 6 minutes on a 210° C. surface, a fine-celled uniform foam developed from the film. The foam film was tightly adhered to the foil. It was 87.15 mils thick and had a density of 7.9 lbs. per cu. ft.

EXAMPLE VII

Polypropylene resin pellets (0.901 density, 3.5 g./10 min. melt flow at 230° C.) was dry-blended with 8.2 percent by weight of azodicarbonamide and then milled for 10 minutes at 165° C. The blended composition was then sheeted from the mill, rapidly cooled, and granulated. The granulated compound was fed to the extruder as described in Example I. The temperature during extrusion was controlled to between 120° and 195° C. An unexpanded film 10.13 mils thick was obtained. This film was placed between two sheets of 1.5-mil thick aluminum foil and heated in an oven for 12 minutes until the temperature of the foil reached 200° C. After cooling to below 30° C., the average thickness of the resulting expanded film was 98 mils and its density was 5.68 lbs./cu. ft. The expanded film was smooth surfaced and had a homogeneous dispersion of fine cells.

EXAMPLE VIII

Using the same resin as in Example VII, 6.5 percent by weight of barium azodicarboxylate was compounded by milling at 182° C. for 10 minutes. The blended composition was sheeted, cooled, granulated, and fed to the extruder as described in Example I. Extrusion temperature was within the range of 150° to 220° C. A cast film 9.5 mils thick was produced. This film was placed between two sheets of 1.5-mil thick aluminum foil and heated in an oven at 250° C. for 18 minutes at which point the temperature of the sample reached 225° C. The sample was cooled to below 30° C. to yield a cellular, homogeneous, smooth surfaced film with a thickness of 84 mils and a density 6.25 lb./cu. ft.

EXAMPLE IX

By the procedure described above, a high density polyethylene resin (0.948 density, 9.5 g./10 min. melt index) was compounded with 8.5 percent by weight of azodicarbonamide using a milling temperature of 160° C. Extrusion temperatures were controlled to within the range of 120° to 190° C. A uniform film 12.4-mil thick resulted. This film was placed between two 9-mil thick layers of corrugated box type paper and then heated in an oven at 280° C. for 15 minutes at which point the temperature of the sample was approximately 200° C. The expanded foam sample was cooled to below 30° C. to yield a cellular film bonded to the paper substrates and having a thickness of 108 mils and a density of 6.54 lbs./cu. ft.

EXAMPLE X

A high density polyethylene resin (0.948 density, 0.5 g./10 min. melt index) was compounded with 7.5 percent by weight of barium azodicarboxylate using the procedure and conditions of Example VIII to obtain an unexpanded film of 11.5 mils thickness. This unexpanded film was placed between two sheets of 1.5-mil thick aluminum foil and heated in an oven at 280° C. for 20 minutes at which point the temperature of the sample reached approximately 165° C. The unexpanded film was cooled to below 30° C. to yield a homogeneous cellular film of 97 mils thickness and having a density of 6.70 lbs./cu. ft.

While there are above disclosed but a limited number of embodiments of the invention herein presented, it is possible to produce still other embodiments without departing from the invention concept herein disclosed. It is desired, therefore, that only such limitations be imposed on the appended claims as are stated thereon.

What is claimed is:

1. A process for the production of a laminate containing foamed plastic films having substantially uniform thicknesses and smooth surfaces, which consists of the sequential steps of intimately mixing a finely-divided solid, polyolefin with about 0.1 to about 10 percent by weight of a finely-divided solid blowing agent, forming an unfoamed film having a substantially uniform thickness and smooth surface from said mixture, placing the film on a substantially solid substrate, and heating the film and substrate at a temperature sufficient to decompose said blowing agent and to melt said polyolefin and produce a foamed polyolefin film bonded to said substrate.

2. The process of claim 1 wherein the film is placed between two substantially solid substrates and the resulting foamed film is bonded between said substrates.

3. The process of claim 1 wherein the polyolefin is polyethylene.

4. The process of claim 1 wherein the polyolefin is polypropylene.

5. The process of claim 1 wherein the film and substrate are heated to a temperature of about 35° to 150° C. above the melting temperature of the polyolefin.

6. The process of claim 1 wherein the blowing agent is an organic compound.

7. The process of claim 1 wherein the blowing agent is an inorganic compound.

8. A process for the production of foamed polyethylene films having substantially uniform thicknesses and smooth surfaces which consists of mixing finely-divided solid polyethylene having an average particle size of less than about 2000 microns with about 0.1 to 10 percent by weight of a finely-divided solid blowing agent, forming a film from said mixture, placing the film on a substantially solid substrate, heating the film and substrate at a temperature sufficient to decompose said blowing agent and to melt said polyethylene and to bond said polyethylene to said substrate and subsequently cooling the foamed polyethylene film to a temperature below the fusion temperature of the polyethylene.

9. The process of claim 8 wherein the polyethylene film is placed between two substantially solid substrates and the resulting foamed product is bonded between said substrates.

References Cited
UNITED STATES PATENTS

| | | | |
|---|---|---|---|
| 2,918,702 | 12/1959 | Wetterau | 156—78 |
| 2,943,949 | 7/1960 | Petry | 156—78 |
| 2,962,407 | 11/1960 | Aykanian | 156—78 X |
| 2,983,962 | 5/1961 | Merz et al. | 156—244 X |
| 2,984,161 | 5/1961 | Cook et al. | 156—244 |
| 3,093,525 | 6/1963 | Wilson et al. | 156—79 |
| 3,213,071 | 10/1965 | Campbell | 156—244 |
| 3,220,901 | 11/1965 | Holmstrom et al. | 156—79 |

EARL M. BERGERT, *Primary Examiner.*

CLIFTON B. COSBY, *Assistant Examiner.*